Dec. 21, 1937.  N. C. RHEW  2,102,818
FRANKFURTER HOLDER
Filed Jan. 11, 1937  2 Sheets-Sheet 2
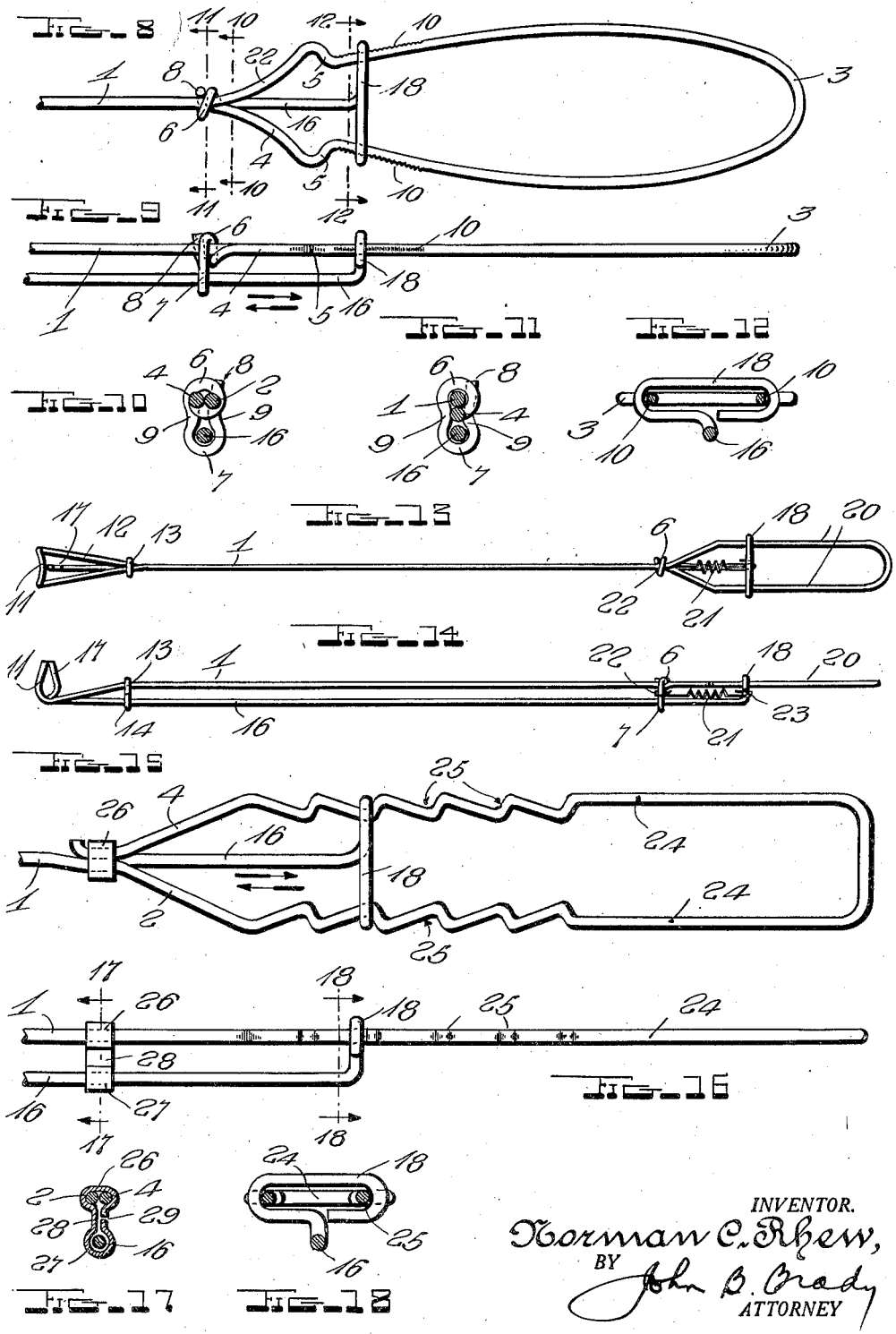

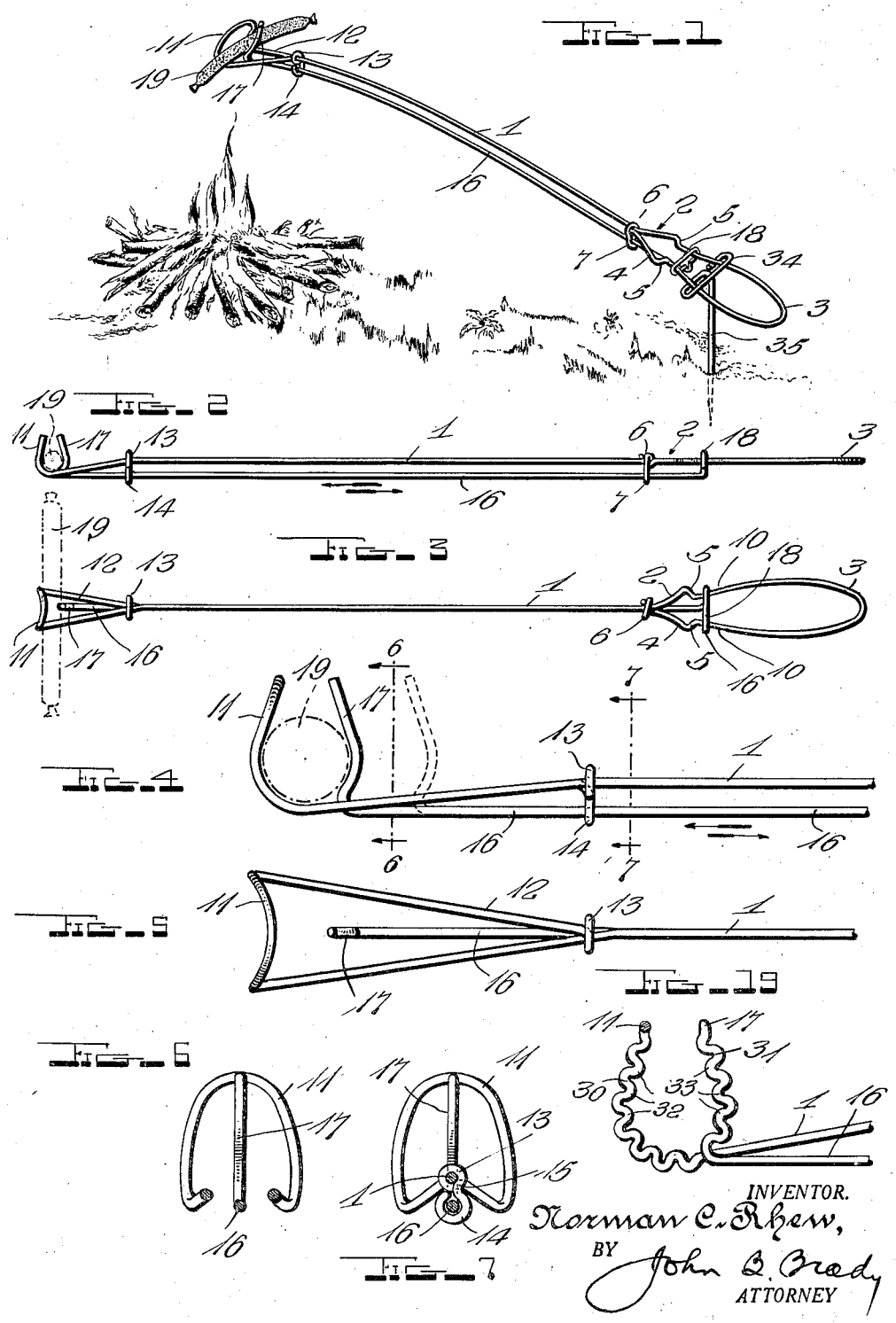

Patented Dec. 21, 1937

2,102,818

UNITED STATES PATENT OFFICE 2,102,818

FRANKFURTER HOLDER

Norman C. Rhew, Rougemont, N. C.

Application January 11, 1937, Serial No. 120,079

2 Claims. (Cl. 53—5)

My invention relates broadly to meat holders and more particularly to a simplified construction of frankfurter holder which is simple and inexpensive in construction and yet positive in operation.

One of the objects of my invention is to provide a simplified construction of meat holder by which meat may be supported in a position for roasting over a fire without danger of the meat being released or dropped from the holder.

Another object of my invention is to provide a simplified construction of wire like device by which meat to be roasted may be supported over a fire in a positive manner.

Still another object of my invention is to provide a simplified construction of meat holder including a frame like member and a coacting adjustable device having means for gripping meat in a positive manner for supporting the meat in a roasting position over a fire.

A further object of my invention is to provide a simplified and inexpensive construction of wire like holder for roasting frankfurters having positive means for latching a clamping device in a position for maintaining a frankfurter over a roasting flame.

A still further object of my invention is to provide a frame structure having a handle at one end and a pair of coacting gripping members at the other end between which a frankfurter may be positively clamped in position by control means operative from the handle.

Other and further objects of my invention reside in the construction of meat holder described more fully in the specification hereinafter following and shown in the accompanying drawings in which:

Figure 1 is a perspective view of the meat holder of my invention shown in use; Fig. 2 is a side elevation of the meat holder; Fig. 3 is a plan view of the meat holder; Fig. 4 is a side elevational view of the coacting parts of the meat holder at the clamping end of the device and showing the coacting clamping devices on an enlarged scale; Fig. 5 is a plan view of the portion of the meat holder shown in Fig. 4; Fig. 6 is a transverse sectional view taken on line 6—6 of Fig. 4; Fig. 7 is a view similar to that of Fig. 6 taken on line 7—7 of Fig. 4; Fig. 8 is a plan view on an enlarged scale showing the handle portion of the meat holder; Fig. 9 is a side elevational view of the handle portion of the meat holder shown in Fig. 8; Figs. 10, 11 and 12 are transverse vertical sectional views taken on lines 10—10, 11—11 and 12—12 of Fig. 8, respectively; Fig. 13 is a top plan view of a modified form of meat holder embodying my invention; Fig. 14 is a side elevational view of the meat holder illustrated in Fig. 13; Fig. 15 is an enlarged plan view of another modified form of meat holder embodying my invention showing a handle structure provided with serrations which permit the displaceable coacting securing member to be latched in position with respect to the coacting securing member on the frame structure with meat, fish or frankfurters of various sizes clamped therebetween; Fig. 16 is a side elevation of the modified construction shown in Fig. 15; Figs. 17 and 18 are transverse vertical sectional views taken on lines 17—17 and 18—18, respectively; and Fig. 19 is a detailed fragmentary longitudinal sectional view of a modified form of coacting jaw construction where the jaws are corrugated to provide a multiplicity of gripping faces for positively gripping a frankfurter or piece of meat or fish.

Referring to the drawings in more detail, reference character 1 designates a wire like frame which is bent at one end at 2 to form a handle which is looped at 3 and extends into a return bend 4. The portions of the handle between the bend 2 and the return bend 4 are provided with symmetrically arranged abrupt off-sets shown at 5 which provide limits in one direction toward which the adjustable grip may be moved as will be hereinafter described. The extended end 6 of the wire like member is wrapped or turned over the wire frame 1, as shown at 6 and is extended in the form of a depending loop as indicated at 7. The raw end of the frame wire 1 is turned upwardly and terminates as indicated at 8. The depending loop 7 is provided with indented portions 9 in the side thereof, as indicated in Fig. 10, thus providing an enclosed guide for the reciprocatory adjustable slide wire member 16. The loop 3 is provided with serrations 10 in opposite sides thereof, extending from a position adjacent the symmetrically disposed abrupt off-sets 5 to a position toward the end of the handle 3 to the approximate limit to which the reciprocatory slide wire member 16 would ever be shifted. The serrations 10 provide positive gripping means serving to maintain the reciprocatory slide wire member 16 in the position to which it is shifted.

The gripping end of the meat holder comprises a substantially semi-circular shaped gripping end 11 formed integral with the wire frame 1 and having a return bend end portion 12 which is looped over and around the wire like frame 1 as indicated at 13 and depends downwardly as shown at 14 and turned over to provide a guide as illustrated more clearly in Fig. 7 through which the reciprocatory slide wire member 16 may be adjusted. The depending end 13 of the wire frame is indented as represented at 15 to provide the shaped guide for the reciprocatory slide wire member 16.

Heretofore the jaw like device at 11, carried by the frame 1 has been described. The reciprocatory slide wire member 16 which coacts with the semi-circular shaped jaw 11, is provided with a complementary coacting substantially semi-circular shaped end 17 so that a frankfurter or other piece of meat or fish, indicated generally at 19, may be readily clamped therebetween. The substantially semi-circular shaped jaw 17 is disposed centrally of the two side portions making up the substantially semi-circular shaped jaw 11 so that a frankfurter may be securely clamped by one clamping jaw exerting a force in one direction in a plane between the sides of the other clamping jaw, both sides of which exert a force against the frankfurter in the opposite direction.

The reciprocatory slide wire device 16 has a looped end 18 which encircles the looped handle 3 and is adapted to engage in the serrations 10 for maintaining the reciprocatory slide wire member 16 in a position for clamping the article between the clamping jaws. In order to allow movement of the looped end 18 to a desired position for effecting clamping, the sides of the looped handle 3 are formed of resilient wire which allows the sides of the loop to be squeezed inwardly and sprung outwardly to positively latch loop 18 in position.

As I have shown in Figs. 13 and 14, the sides of the handle may be maintained parallel as indicated at 20 and clamping action obtained by imposing a spring 21 between a connection 22 on depending loop 7 and a connection 23 on the looped end 18 of the reciprocatory slide wire member 16. It is only necessary to spread the jaws by applying a force to looped member 18 for retracting the semi-circularly shaped end 17 of the reciprocatory slide wire member 16 to permit the insertion of the frankfurter, meat or other article between the complementary coacting jaws 11 and 17, after which the looped end 18 is released allowing the spring 21 to shift the coacting jaws into relatively tight engagement with the article being supported.

Where it is necessary to employ the holder of my invention for heavier articles or for a multiplicity of frankfurters, I provide the construction illustrated in Figs. 15 and 16. In this arrangement the handle 24 is provided with a multiplicity of successively disposed notches 25 formed in the wire like handle and which serve as a positive latching means for securing the looped end of slide wire member 16 in predetermined position. To facilitate the shifting of the looped end 18 to a desired position, the side portions of the wire like handle 24 may be squeezed inwardly toward each other for a sufficient distance to allow loop 18 to be passed to the notch at which the spacial relation between the clamping jaws must be fixed. The spacial relation between the frame 1 and the reciprocatory slide wire device 16 may be maintained in this construction by means of a sheet metal guide clip 26 having depending portion 27 pressed inwardly at 28 with the meeting ends 29 of the metallic clip 26 suitably spot welded to provide a substantial carrier and guide for the reciprocatory slide wire member 16.

In order to insure the maintenance of a frankfurter in position between the clamping jaws of the holder, I may provide a construction of coacting jaws as illustrated in Fig. 19 wherein the substantially semi-circular shaped end 11 of the frame 1 is also given a sinuous shape as shown at 30 in Fig. 19 providing a multiplicity of engaging faces 32. The reciprocatory slide wire member 16 has the substantially semi-circular end 17 thereof also provided with a substantially sinuous shape to provide a multiplicity of coacting engaging faces 33. The grip obtained by jaw 17 engaging the frankfurter in position intermediate the sides of jaw 11 is considerably increased by the action of the multiple faces 32 and 33 against the frankfurter, fish or other article.

As illustrated in Fig. 1, the holder of my invention may be readily supported over a fire by passing the looped end 3 of the handle through the looped end 34 of the spike 35 which may be driven into the ground in such a position as will insure the maintenance of the holder at a sufficient angle with respect to the fire for permitting roasting of meat, frankfurters or fish carried by the holder. In lieu of the support of the holder permanently with respect to the fire, the holder may be readily held in the hand until the meat, frankfurter or fish has been properly roasted.

It will be seen that the holder of my invention may be readily manufactured inexpensively on a quantity basis for wide distribution and sale. While I have described my invention in certain of its preferred embodiments I desire that it be understood that modifications may be made and that no limitations upon my invention are intended other than may be imposed by the scope of the appended claims.

What I claim as new and desire to secure by Letters Patent of the United States is as follows:

1. A frankfurter holder comprising a wire frame structure having a handle portion and a curved end portion, a slide wire member reciprocative with respect to said wire frame structure, said slide wire member having a curved end complementary to the curved end of said frame structure and coacting therewith, a looped member formed on the opposite end of said slide wire member and encircling the handle portion of said wire frame structure and serrations formed in said handle portion and engageable by said looped member for maintaining the curved end of said slide wire member in predetermined relation to the wired end of said frame structure.

2. A frankfurter holder comprising a wire frame structure having a handle portion and a curved end portion, a slide wire member reciprocative with respect to said wire frame structure, said slide wire member having a curved end complementary to the curved end of said frame structure and coacting therewith, a looped member formed on the opposite end of said slide wire member and encircling the handle portion of said wire frame structure and off-set bends formed in the sides of said handle portion and engageable by said looped member for maintaining the wire end of said slide wire member in predetermined relation to the curved end of said frame structure.

NORMAN C. RHEW.